July 10, 1956 — C. M. TURSKY — 2,754,005
FILTER APPARATUS
Filed Nov. 20, 1953
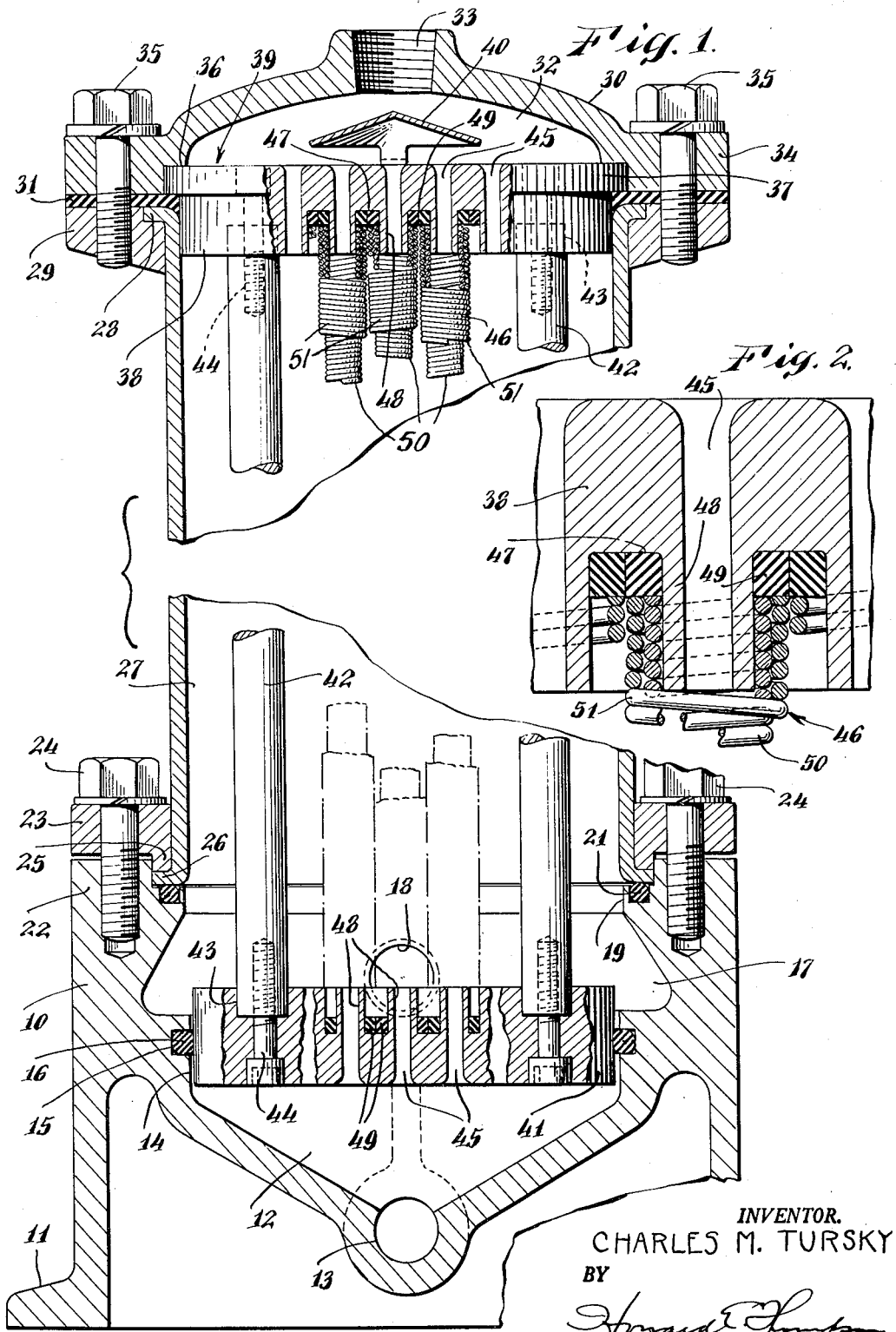
INVENTOR.
CHARLES M. TURSKY

United States Patent Office 2,754,005
Patented July 10, 1956

2,754,005

FILTER APPARATUS

Charles M. Tursky, Plainfield, N. J.

Application November 20, 1953, Serial No. 393,264

7 Claims. (Cl. 210—184)

This invention relates to apparatus for filtering or separating materials or fluids. More particularly, the invention deals with apparatus of the character described employing a filter unit, comprising a nesting of filter coils arranged in close proximity to each other, each filter element of the unit comprising inner and outer filter coils arranged in crossed relationship to each other and preferably of different degrees of filtration.

Still more particularly, the invention deals with an apparatus of the character described wherein the medium to be filtered is passed into the filter coils, and the filtrate passes outwardly through the coils into a discharge chamber and apparatus with means at the lower portion of the apparatus for collecting and discharging the unfiltered portions of the medium being filtered.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a broken sectional view through an apparatus made according to my invention, showing only part of the nested coils of the filter unit; and Fig. 2 is an enlarged detail sectional view showing the sealing and mounting of the inner and outer coils of each filter element in connection with one of the end plate structures.

In carrying my invention into effect I employ a filter apparatus comprising a base in the form of a casing 10 having a flanged bottom 11 for mounting on a suitable support, the base having a contracted sump or drain 12 with a tubular discharge 13 opening out through one side of the casing, the upper part of the sump or drain terminating in an annular wall 14 in which is a ring groove 15 for supporting the neoprene or other sealing ring 16.

Above the annular wall 14 the casing has an enlarged discharge chamber 17 into which the filtrate passes, this chamber having a discharge passage 18 at one side thereof preferably in alinement with and above the discharge 13. The upper part of the base casing has a narrow annular wall 19 substantially of the same diameter as the wall 14, and the upper surface of the wall portion 19 has an annular ring groove 20 in which is mounted a neoprene sealing ring 21. The casing outwardly of the groove 20 has an upwardly extending annular portion 22, upon which a mounting ring 23 is secured by means of circumferentially spaced screws 24. The ring 23 has an annular flange 25 which fits within the raised portion 22 and is adapted to bear upon an outwardly extending bottom flange 26 on a cylinder 27.

The cylinder 27 can be composed of any type and kind of material and, in some instances, transparent materials will be used, particularly when it is desirable to observe the operation of the filter.

In the assemblage, it will appear that the flange 26 of the cylinder 27 is sealed upon the ring 21. The upper end of the cylinder 27 has an outwardly extending flange 28 similar to the flange 26 which is engaged by another flange ring 29, in mounting an upper head or casing part 30 upon the cylinder, a wide inner preen or other sealing ring 31 being employed to seal the cylinder on the casing 30. At this time it is pointed out that the two rings 23 and 29 are arranged upon the cylinder prior to forming the outwardly extending flanges 26 and 28 thereon.

The upper casing 30 is dome shaped in form to provide an admission chamber 32, the central portion of the casing having an admission port 33 with which a suitable pipe, not shown, can be coupled in the circulation of a medium to be filtered or separated through the filtering apparatus. The casing 30 has a large annular peripheral flange 34, through which are passed screws 35 in clamping the casing 30 on the cylinder 27. The casing 30 inwardly of the flange 34 has an annular groove 36 which overlies the upper edge of the cylinder so that an outwardly extending annular flange 37 on the top plate 38 of a filter unit 39 is positioned to engage the sealing ring 31 in effecting a seal between the unit 39 and the cylinder 27. A conical-like or flared baffle 40 is mounted in the casing 30 above the plate 38 and spaced therefrom so as to deflect the medium to be filtered to outer extremities of the chamber 32, while at the same time permitting the medium to extend beneath the baffle so as to be accessible to all of the filter coil elements of the unit 39.

The unit 39 also includes a bottom plate 41 and the two plates are coupled together in predetermined fixed spacing by a plurality of coupling and spacing rods 42, two of which are shown in Fig. 1 of the drawing, and four of these rods are preferably employed. The rods seat in recesses 43 in adjacent surfaces of the plates 38 and 41 and are secured in position by screws 44, the heads of which are countersunk in the plates 38 and 41. The diameter of the plate 41 is such as to pass freely down through the cylinder 27 through the wall portion 19 and into the wall portion 14 and operatively engaging the sealing ring 16 to seal the plate 41 in the casing 10, thus preventing any material from the chamber 17 from passing into the chamber 12 or vice versa.

Each of the plates 38 and 41 are substantially of the same construction, except for the inclusion of the flange 37 on the plate 38. Thus the brief description of the other specific structure of each plate is the same and, accordingly, the brief description of one will apply to both. The plates have vertically alined circumferentially and radially arranged apertures 45 which are so positioned on the plate as to provide for the close nesting of a multiplicity of filter elements 46 in the chamber of the cylinder 27, this nesting being interrupted only by the spacing and coupling rods 42. In order to simplify the present illustration, only a small portion of the filter elements 46 are indicated, it being understood that these elements extend to positions in close proximity to the walls of the cylinder 27 so that in the nesting substantially the entire cross sectional area of the cylinder 27 is covered, except for the spacing between adjacent nested coils and the spacing between adjacent circumferentially arranged coils adjacent the wall of the cylinder 27.

Around each of the apertures 45, the casing has annular ring-type grooves 47, and these grooves will intersect at adjacent coils, as clearly indicated in Fig. 1 of the drawing. In other words, the groove 47 of the center aperture 45 of the plate 38 is shown intersecting with the grooves around two radially spaced apertures adjacent said center aperture. The showing in Fig. 1 is diagrammatic in this respect in order to illustrate this feature of the invention, it being understood that, while an alinement of this type and kind exists, it would not be at the dead center of the plate 38 but at one side of this center.

The grooves 47 form on the plates 38 and 41 around the apertures 45 a sleeve portion 48, and mounted on each sleeve portion and arranged within the groove 47 around the sleeve portion is a near preen or other sealing ring 49. The filter units 46 each comprise inner and outer filter coils 50 and 51, the windings of which are preferably disposed in opposed directions so that the coils of one filter will cross the coils of the other filter, as is clearly illustrated in Fig. 2 of the drawing. The ends of both coils are disposed on the sleeve portions 48 and engage the rings 49 so as to seal each of the elements 46 on the plates 38 and 41.

It is also desirable to have the coils of adjacent elements 46 disposed in opposed relationship to each other so that the windings of adjacent coils will cross each other, where they abut or are in close proximity to each other. This arrangement will increase the efficiency of the operation, particularly in providing clearance spaces or passages between the adjacent coils for passage of the filtrate.

For purposes of description, the base casing and cylinder may be said to comprise a casing with the upper casing part 30 defining a head detachable with respect to the remainder of the casing. In the operation of the filter in filtering liquids or other mediums which are usually introduced into the filter under a pressure, I have found from experience that the filter elements, or the coils thereof, participate in what might be termed a breathing action, in other words, slight intermittent radial movement, which action aids in transmission of the filtrate through the coils, as well as displacing the non-filtered portions, or sediment of the fluid, for transmission to the sump. In other words, this action has a tendency to keep the minute passages between the windings of the coils separated. In this connection, the coils are made in accordance with the teachings in my prior application, Serial Number 183,553, filed September 7, 1950, now Patent No. 2,667,272, dated January 26, 1954, and, for this reason, no detailed showing of the coils is made in this particular application.

The terms upper and lower, or base, casings, are descriptively used in the specification and claims to define what can also be regarded as the head and base of the filter apparatus.

Having fully described my invention, what I claim as new and desire to secure by Letters Patent is:

1. A filtering apparatus, comprising a base forming a lower casing, an upper casing, a cylinder joining said casings, a filter unit detachable as a unit with respect to the casings and cylinder through the upper open end of the cylinder upon removal of said upper casing, said unit comprising top and bottom plates sealed in said upper and base casings respectively, said plates having circumferentially and radially arranged sleeve portions on facing surfaces of said plates, the sleeve portions of the plates including apertures opening through upper and lower surfaces of the plates, a plurality of filter elements mounted on the sleeve portions and extending between said top and bottom plates, and means bridging said plates for retaining the plates in predetermined spaced relationship to each other.

2. A filtering apparatus, comprising a base forming a lower casing, an upper casing, a cylinder joining said casings, a filter unit detachable as a unit with respect to the casings and cylinder through the upper open end of the cylinder upon removal of said upper casing, said unit comprising top and bottom plates sealed in said upper and base casings respectively, said plates having circumferentially and radially arranged sleeve portions on facing surfaces of said plates, the sleeve portions of the plates including apertures opening through upper and lower surfaces of the plates, a plurality of filter elements mounted on the sleeve portions and extending between said top and bottom plates, means bridging said plates for retaining the plates in predetermined spaced relationship to each other, means for sealing the filter elements on said plates, the upper casing forming, above the top plate of said unit, an admission chamber exposed to all of the apertures of said top plate, and the base casing having a downwardly contracted sump exposed to all of the apertures of the bottom plate of said unit.

3. A filtering apparatus, comprising a base forming a lower casing, an upper casing, a cylinder joining said casings, a filter unit detachable as a unit with respect to the casings and cylinder through the upper open end of the cylinder upon removal of said upper casing, said unit comprising top and bottom plates sealed in said upper and base casings respectively, said plates having circumferentially and radially arranged sleeve portions on facing surfaces of said plates, the sleeve portions of the plates including apertures opening through upper and lower surfaces of the plates, a plurality of filter elements mounted on the sleeve portions and extending between said top and bottom plates, means bridging said plates for retaining the plates in predetermined spaced relationship to each other, means for sealing the filter elements on said plates, the upper casing forming, above the top plate of said unit, an admission chamber exposed to all of the apertures of said top plate, the base casing having a downwardly contracted sump exposed to all of the apertures of the bottom plate of said unit, the base casing having a discharge chamber communicating with chamber of the cylinder around said filter elements, and the base casing having a discharge communicating with the lower portion of said sump.

4. A filtering apparatus, comprising a base forming a lower casing, an upper casing, a cylinder joining said casings, a filter unit detachable as a unit with respect to the casings and cylinder through the upper open end of the cylinder upon removal of said upper casing, said unit comprising top and bottom plates sealed in said upper and base casings respectively, said plates having circumferentially and radially arranged sleeve portions on facing surfaces of said plates, the sleeve portions of the plates including apertures opening through upper and lower surfaces of the plates, a plurality of filter elements mounted on the sleeve portions and extending between said top and bottom plates, means bridging said plates for retaining the plates in predetermined spaced relationship to each other, and said filter elements comprising inner and outer filter coils having a sealed engagement with said top and bottom plates.

5. A filtering apparatus, comprising a base forming a lower casing, an upper casing, a cylinder joining said casings, a filter unit detachable as a unit with respect to the casings and cylinder through the upper open end of the cylinder upon removal of said upper casing, said unit comprising top and bottom plates sealed in said upper and base casings respectively, said plates having circumferentially and radially arranged sleeve portions on facing surfaces of said plates, the sleeve portions of the plates including apertures opening through upper and lower surfaces of the plates, a plurality of filter elements mounted on the sleeve portions and extending between said top and bottom plates, means bridging said plates for retaining the plates in predetermined spaced relationship to each other, said filter elements comprising inner and outer filter coils having a sealed engagement with said top and bottom plates, the inner filter coils having their windings disposed angularly with respect to the outer filter coil in each filter element, and the arrangement of the windings of the outer coils of adjacent filter elements in the unit being angularly to each other.

6. A filtering apparatus, comprising a base forming a lower casing, an upper casing, a cylinder joining said casings, a filter unit detachable as a unit with respect to the casings and cylinder through the upper open end of the cylinder upon removal of said upper casing, said unit comprising top and bottom plates sealed in said upper and base casings respectively, said plates having circumferentially and radially arranged sleeve portions on facing surfaces of said plates, the sleeve portions of the plates including apertures opening through upper and lower surfaces of the plates, a plurality of filter elements mounted on the sleeve portions and extending between said top and bottom plates, means bridging said plates for retaining the plates in predetermined spaced relationship to each other, means for sealing the filter elements on said plates, the upper casing forming, above the top plate of said unit, an admission chamber exposed to all of the apertures of said top plate, the base casing having a downwardly contracted sump exposed to all of the apertures of the bottom plate of said unit, the upper casing having a central admission aperture opening into said admission chamber, and a baffle in said chamber in alinement with said admission aperture.

7. A filter apparatus of the character described, comprising a cylinder-type casing, having an upper detachable casing part controlling admission to the cylinder of the casing, a filter unit detachable as a unit with respect to the casing through the upper end thereof, means for sealing said unit in the casing, said unit comprising top and bottom plates secured together and spaced by a plurality of rods, a plurality of filter elements bridging said plates and sealed on each of the plates, said elements comprising wire coils with the coils of adjacent elements arranged angularly to each other, the upper casing part forming an admission chamber, the top plate having apertures placing the admission chamber in communication with the interior of each of the filter elements, the bottom plate of said unit having apertures communicating with the interior of each of the filter elements and opening into a sump in the lower portion of the casing, and the lower portion of the casing, above said bottom plate of the unit, having a discharge chamber.

References Cited in the file of this patent
UNITED STATES PATENTS

| | | |
|---|---|---|
| 671,003 | Ruthenburg | Apr. 2, 1901 |
| 1,812,773 | Cannon | June 30, 1931 |
| 1,877,157 | Cannon | Sept. 13, 1932 |
| 2,100,266 | Perry | Nov. 23, 1937 |
| 2,600,458 | Ackley et al. | June 17, 1952 |
| 2,667,271 | Tursky | Jan. 26, 1954 |

FOREIGN PATENTS

| | | |
|---|---|---|
| 632,412 | Great Britain | Nov. 28, 1949 |